United States Patent [19]
Arkell et al.

[11] 3,760,017
[45] Sept. 18, 1973

[54] HYDROALKYLATION CATALYST AND PROCESS

[75] Inventors: Alfred Arkell, Wappingers Falls; John M. Crone, Jr., Fishkill; Robert M. Suggitt, Wappingers Falls, all of N.Y.

[73] Assignee: Texaco, Inc., New York, N.Y.

[22] Filed: May 17, 1971

[21] Appl. No.: 144,211

[52] U.S. Cl. .......... 260/668 F, 260/667, 260/668 R
[51] Int. Cl. ........................................... C07c 15/20
[58] Field of Search ............. 260/667, 668 R, 668 F

[56] References Cited
UNITED STATES PATENTS

| | | | |
|---|---|---|---|
| 3,412,165 | 11/1968 | Slaugh et al. | 260/667 |
| 3,153,678 | 10/1964 | Logemann | 260/667 |
| 3,274,276 | 9/1966 | Louvar | 260/667 |
| 3,317,611 | 5/1967 | Louvar et al. | 260/667 |
| 3,397,249 | 8/1968 | Aben et al. | 260/667 |
| 3,491,019 | 1/1970 | Pollitzer et al. | 260/667 |

*Primary Examiner*—Curtis R. David
*Attorney*—Thomas H. Whaley, Carl G. Ries and H. L. Madinger

[57] ABSTRACT

A method for the catalytic hydroalkylation of an aromatic hydrocarbon. An aromatic hydrocarbon, for example, benzene is contacted with hydrogen and a dual function catalyst at hydroalkylation conditions including a temperature within the range of about 110° to 450°F. and at a hydrogen pressure of at least one atmosphere. The dual function catalyst comprises a Group VIII metal or metal compound selected from the group consisting of nickel, cobalt and palladium and an acidic oxide suppport consisting essentially of a substantially alkali metal-free mixture of about 5 to 60 percent by weight of a crystalline zeolite and about 95 to 40 percent by weight of a silica-alumina cracking catalyst. Preferred Group VIII metals include nickel and palladium. The hydrogenation activity of the Group VIII metal may be modified by the inclusion of tungsten. Before use the composite catalyst is calcined at a temperature within the range of about 800° to 1,500°F. and is reduced with hydrogen at a temperature within the range of about 400° to 1,200°F. The process is useful in the hydroalkylation of benzene to prepare cyclohexylbenzene.

14 Claims, No Drawings

HYDROALKYLATION CATALYST AND PROCESS

BACKGROUND OF THE INVENTION

Cycloalkylbenzenes may be produced by the hydroalkylation of benzene and alkylbenzene hydrocarbons. For example, benzene may be reacted with hydrogen in the presence of a hydroalkylation catalyst to produce cyclohexylbenzene. By-products of this reaction may include cyclohexane, methylcyclopentane, dicyclohexylbenzenes and polycyclohexylbenzenes. Similarly, toluene may be hydroalkylated to produce methylcyclohexyltoluenes. Other alkylbenzenes may be hydroalkylated to produce the corresponding alkylcyclohexylalkylbenzenes. Mixtures of dissimilar aromatic hydrocarbons may be hydroalkylated in which case the more readily hydrogenated species tends to alkylate the less readily hydrogenated compound. For example, a hydroalkylation of a benzene-toluene mixture may produce a product predominating in cyclohexyltoluene since benzene may be hydrogenated more readily than toluene. Products of the hydroalkylation process such as cyclohexylbenzene are valuable as solvents and as chemical intermediates. For example, cyclohexylbenzene is of commercial importance as a solvent and plasticizer in the plastics coatings and adhesive fields and as an intermediate in the manufacture of cyclohexanone and phenol by air oxidation and acid decomposition.

It is an object of the present invention to provide an improved catalyst and process for the hydroalkylation of benzene and alkylbenzene hydrocarbons. It is a further objective to provide a highly active hydroalkylation catalyst achieving high selectivity in conversion of benzene and alkylbenzenes to the corresponding cyclohexylbenzenes and cyclohexylalkylbenzenes. It is a further objective to provide a stable hydroalkylation catalyst capable of maintaining a high activity and selectivity in sustained use on a continuous basis.

SUMMARY OF THE INVENTION

It is postulated that the hydroalkylation of benzene to cyclohexylbenzene, as an example of the hydroalkylation process, proceeds by hydrogenation of a part of the benzene to a cyclohexene intermediate which intermediate then alkylates remaining benzene to produce the cyclohexylbenzene product. Thus the dual catalytic functions of hydrogenation and alkylation are required. However, a careful balance of these two functions is necessary such that the hydrogenation and alkylation reactions may proceed at complimentary rates. Hydrogenation activity is imparted by the use of a metallic catalyst, for example, a Group VIII metal while alkylation requires an acidic type catalyst. Excessive hydrogenation activity results in the production of unwanted cyclohexane whereas excessive acid activity may result in isomerization of the intermediates so that the final reaction product comprises a variety of products besides cyclohexylbenzene. In accordance with the process of this invention a hydroalkylation catalyst of high activity, selectivity, and stability is prepared by calcining and reducing the catalyst comprisng a Group VIII metal selected from the group consisting of cobalt, nickel and palladium and an acidic oxide support consisting essentially of a substantially alkali metal-free mixture of about 5 to 60 percent by weight of a crystalline zeolite and about 95 to 40 percent by weight of a silica alumina cracking catalyst. The foregoing composition is calcined at a temperature within the range of about 800° to 1500°F. preferably within the range of about 1000° to 1200°F. and is reduced at a temperature within the range of about 400° to 1200°F. and preferably within the range of about 500° to 1000°F. to prepare the hydroalkylation catalyst of our improved process. Hydroalkylation is effected by contacting an aromatic hydrocarbon charge selected from the group consisting of benzene, alkylbenzenes, and their mixtures with the foregoing catalyst at hydroalkylation conditions including a reaction temperature within the range of about 110° to 450°F. and preferably within the range of about 300° to 400°F. and at a hydrogen partial pressure in excess of one atmosphere and preferably within the range of about 100 to 500 pounds per square inch gauge.

DESCRIPTION OF THE PREFERRED EMBODIMENTS

The improved process of the present invention is carried out in the presence of a novel hydroalkylation catalyst. The catalyst comprises a hydrogenating component and an alkylating component. The hydrogenating component comprises a metal or a compound of a metal selected from the grop consisting of cobalt, nickel and palladium which are Group VIII metals. The alkylating component of the catalyst comprises an acidic oxide support consisting essentially of a substantially alkali metal-free mixture of about 5 to 60 percent by weight of a crystalline zeolite and about 95 to 40 percent by weight of a silica-alumina cracking catalyst. The hydrogenating component may be modified by the inclusion of tungsten or a tungsten compound.

The crystalline zeolite used in the catalyst is advantageously prepared from Zeolite Y, described in U.S. Pat. No. 3,130,007, because catalysts prepared therefrom have high steam and thermal stability. The crystalline zeolite is modified to the extent that a considerable portion of the alkali metal is substituted by a hydrogen ion or an ion which is convertible to hydrogen, for example, ammonium. Sodium, present in the zeolite as originally produced is replaced by the positive hydrogen or ammonium ion by means of ion exchange. Suitably, this is done by contacting the zeolite with an aqueous solution of an organic or ionorganic acid or an ammonium compound. Suitable acids include hydrochloric acid, sulfuric acid, nitric acid, sulfurous acid, acetic acid, oxalic acid, propionic acid, benzoic acid and the like. Ammonium ion may be supplied from nitrogen-containing compounds such as ammonium chloride, ammonium sulfate, ammonium sulfide, methylamines and the like.

For the removal of more than about 70 percent of the metal, for example, sodium ion from the zeolite, it is desirable to employ ammonium ion exchange rather than acid treatment since zeolites tend to decompose in a medium having a pH below about 2.5 to 4. The ammonium exchange zeolite is calcined to drive off ammonia and obtain the zeolite in the hydrogen form. The crystalline zeolite is composited with a silica-alumina cracking catalyst in an amount of about 5 to 60 percent by weight of the composite. The silica-alumina cracking catalyst may comprise about 5 to 30 percent by weight alumina and the balance silica.

The silica-alumina cracking catalyst constituent of our composite catalyst may be any of the well known and commercially available silica-alumina cracking catalysts including both synthetic catalysts and those prepared by the processing of clays. Such catalysts are described for example in U.S. Pat. Nos. 2,363,231, 2,469,314 and 2,935,463.

Ordinarily the hydrogenating component is added to the composite of crystalline zeolite and silica-alumina comprising the acidic oxide support. Preferably this is done by contacting the composite with a solution of a compound of the hydrogenating metal component. The hydrogenating component may be deposited by draining any excess solution from the composite and drying. Ordinarily the catalyst is then calcined in an oxidizing atmosphere. By this procedure the hydrogenating component will be in the form of the oxide deposited on the acidic oxide support. Hydrogenating component may also be incorporated into the composite by ion exchange using a solution of a salt of a metal of the hydrogenating component. The hydrogenating component may also be incorporated directly into the crystalline zeolite prior to compositing by ion exchange of the alkali metal form of the zeolite with a soluble salt, for example, the chloride of the hydrogenating metal. The hydrogenating component in the case of cobalt or nickel is generally present in an amount between about 3 and 50 percent by weight of the total catalyst composite and preferably within the range of about 5 to 35 percent. When employing palladium as the hydrogenating component, it is present in an amount within the range of about 0.05 to 5.0 and preferably within the range of about 0.1 to 2.0 percent by weight of the catalyst composite.

In an example of the preparation of the acidic oxide support a commercial Zeolite Y purchased from the Linde Division of Union Carbide Corporation is base exchanged to remove alkali metal and then incorporated in a silica-alumina cracking catalyst. A 16,000 gram portion of the sodium Zeolite Y is slurried in a solution containing 12,000 grams ammonium sulfate and 60 liters of water for two hours at 200°F. and then filtered. This ion exchange procedure is repeated twice with fresh ammonium sulfate solutions and the resulting zeolite washed free of sulfate ion and then dried at 300°F. A 3,492 gram portion of this partially decationized zeolite is calcined at 1,000°F. for three hours with a product recovery of 3,318 grams. The calcined zeolite is then further ion exchanged with a solution containing 6,000 grams of ammonium sulfate in 120 liters of water for two hours at 200°F. and then filtered. This procedure is repeated once and the filter cake washed free of sulfate, dried and then calcined at 1,500°F. for three hours. The product analysis is 0.23% $Na_2O$, 16.5% $Al_2O_3$, 63.7% $SiO_2$ and it has a surface area of 608 $m^2/g$.

A 400 gram portion of the calcined decationized zeolite is thoroughly mixed with 15,180 grams of 75% silica, 25% alumina cracking catalyst filtercake containing 7.9% solids. The mixture is filtered, dried overnight at 300°F. and then calcined at 1,000°F. with a loss of ignition of 11.2% to produce an acidic oxide catalyst support.

A 585 gram portion of the acidic oxide support is sieved through a 20 mesh screen and then mixed with a solution containing 238 grams nickel nitrate and 217 grams ammonium metatungstate in 350 ml water. The mixture is dried on a steam plate and after the addition of 5% sterotex (a hydrogenated vegetable oil) is pilled, the resulting catalyst is dried with air at 700°F. or 4 hours, calcined at 1,000°F. for 4 hours and then reduced, by contact with hydrogen for 4 hours at 900°F. The resulting catalyst is evaluated for hydroalkylation of benzene at the conditions and with results shown in Table I.

TABLE I

| Example | 1 | 2 |
|---|---|---|
| Temperature, °F. | 300 | 300 |
| Pressure p.s.i.g. | 425 | 450 |
| Benzene Feed rate, gms/hr. | 179 | 177 |
| Hydrogen Feed rate mols/hr. | 0.42 | 0.74 |
| Liquid Hourly Space Velocity (LHSV) | 2 | 2 |
| Product Analysis, Wt. % | | |
| Benzene | 82.1 | 72.2 |
| Methylcyclopentane (MCP) | 0.1 | 0.2 |
| Cyclohexane (CH) | 1.8 | 2.8 |
| Cyclohexylbenzenes (CHB) | 14.0 | 21.5 |
| Dicyclohexylbenzenes (DCHB) | 1.9 | 3.0 |
| Unidentified | 0.1 | 0.3 |
| Selectivity (CHB/all products) | 78 | 77.5 |

A catalyst comprising 4 weight percent cobalt is prepared by compositing the acidic oxide support used in Example I with cobalt nitrate, extruding, calcining and reducing. This cobalt catalyst is evaluated at the conditions and with the results shown in Table II.

TABLE II

| Example | 3 | 4 |
|---|---|---|
| Temperature, °F. | 310 | 350 |
| Pressure, p.s.i.g | 500 | 500 |
| Benzene Feed rate gms/hr. | 86 | 85 |
| Hydrogen Feed rate mols/hr. | 0.98 | 0.98 |
| LHSV | 2 | 2 |
| Product Analysis, Wt. % | | |
| Benzene | 73.6 | 82.7 |
| MCP | 0.3 | 0.6 |
| CH | 3.5 | 1.5 |
| CHB | 13.8 | 9.6 |
| DCHB | 8.0 | 4.0 |
| Impurities | 0.8 | 0.6 |
| Selectivity (CHB/all products) | 52 | 55 |

A series of catalysts are prepared by the foregoing procedures employing nickel as the Group VIII metal wherein the nickel content of the composite and the crystalline zeolite content of the acidic oxide support are varied. These catalysts are tested at the conditions and with the results shown in Table III.

TABLE III

| Example | 5 | 6 | 7 | 8 | 9 | 10 | 11 | 12 | 13 |
|---|---|---|---|---|---|---|---|---|---|
| Nickel, wt. percent of catalyst | 6 | 6 | 6 | 6 | 4 | 4 | 4 | 4 | 4 |
| Crystalline zeolite, wt. percent of acidic oxide support | 12 | 12 | 22 | 22 | 22 | 22 | 22 | 22 | 22 |
| Temperature, °F | 325 | 380 | 250 | 300 | 375 | 420 | 330 | 360 | 400 |
| Pressure, p.s.i.g. | 500 | 500 | 431 | 400 | 510 | 510 | 480 | 455 | 404 |
| Benzene feed, cc./hr | 201.25 | 201.25 | 202.5 | 215 | 202.5 | 205 | 202.5 | 205.0 | 207.5 |
| Hydrogen feed, s.c.f./hr | 1.35 | 1.35 | .820 | 1.08 | 1.45 | 1.4 | 1.3 | 1.3 | 1.15 |
| LHSV | 2 | 2 | 2 | 2 | 2 | 2 | 2 | 2 | 2 |
| Product analysis, wt. percent: | | | | | | | | | |
| MCP | .3 | .5 | .3 | .3 | | | | | |
| CH | 2.3 | 1.3 | 10.17 | 13.8 | | | | | |
| CHB | 17.2 | 14.4 | 12.1 | 9.5 | 16.0 | 12.1 | 11.1 | 20.9 | 20.9 |
| DCHB | 1.9 | 1.0 | 2.2 | 0.9 | 1.9 | 1.1 | 1.2 | 1.6 | 2.1 |
| Unidentified | 1.1 | 2.3 | 0.3 | 0.3 | 1.1 | 1.7 | 0.7 | 1.1 | 2.0 |

In accordance with the process of this invention, we have found that the selection of calcining and reducing conditions is important in achieving high yields and high selectivity in the hydroalkylation reaction. The affect of these variables is shown in the following examples 14 to 28. In each case, the indicated catalyst is first calcined and then reduced at the tabulated conditions. In all examples, 39 grams (0.5 mole) of benzene and 2.25 grams of catalyst are added to the reactor. The reactor is then purged with hydrogen, heated to a reaction temperature within the range of 370° to 380°F. and pressured with hydrogen to a pressure of 500 p.s.i.g. Reaction is continued by rocking the reactor while maintaining the pressure at 500 p.s.i.g by the continuous addition of hydrogen until 4,650 cubic centimeters of hydrogen are absorbed. Conversion is expressed as the ratio of the weight of benzene converted to the weight of benzene charged X 100. Selectivity is expressed as the ratio of the weight of cyclohexylbenzene in the product to the weight of benzene converted X 100. Productivity is expressed as the ratio of the weight of cyclohexylbenzene to the product of the time in hours and the catalyst volume. The catalyst compositions, calcining and reducing conditions, and the hydroalkylation results with each are shown in Table IV.

ture than the catalyst containing a lower percentage of zeolite. Example 28 illustrates the marked effect of the hydrogenating metal employed on the reducing temperatures selected. In this case, a catalyst comprising 6 percent nickel on an acidic oxide base containing 8 percent zeolite gives a productivity of 279 when calcined at 1,000°F. and reduced at 900°F.

We claim:

1. A method for the catalytic hydroalkylation of an aromatic hydrocarbon charge selected from the group consisting of benzene, alkylbenzenes and their mixtures which comprises contacting said aromatic hydrocarbon charge and hydrogen at hydroalkylation conditions with a calcined and reduced catalyst comprising a Group VIII metal selected from the group consisting of cobalt, nickel and palladium and an acidic oxide support consisting essentially of a substantially alkali metal-free mixture of about 5 to 60 percent by weight of a crystalline zeolite and about 95 to 40 percent by weight of a silica-alumina cracking catalyst.

2. The method of claim 1 wherein said hydroalkylation conditions include a reaction temperature within the range of about 110° to 450°F. and a hydrogen partial pressure of at least one atmosphere.

3. The method of claim 1 wherein said hydroalkyla-

TABLE IV

| | | Catalyst | | | | | | Product | | | | | | |
|---|---|---|---|---|---|---|---|---|---|---|---|---|---|---|
| Ex. | Hydrogenating metal | Percent hydrogenating metal | Percent zeolite in acidic oxide base | Calcining Hrs. | Calcining Temp., °F. | Reduction Hrs. | Reduction Temp., °F. | MCP | CH | CHB | DCHB | Conversion, wt. percent | Selectivity, percent | Productivity |
| 14 | Palladium | 0.64 | 8 | 2 | 1,200 | 2 | 700 | 0.2 | 4.6 | 26.5 | 3.8 | 35.1 | 75.5 | 143 |
| 15 | do | 0.64 | 8 | 2 | 1,200 | 4 | 600 | 0.1 | 5.9 | 24.7 | 3.7 | 34.4 | 72.0 | 136 |
| 16 | do | 0.64 | 8 | 2 | 1,200 | 1.5 | 600 | 0.2 | 5.6 | 24.1 | 3.1 | 33.1 | 72.9 | 178 |
| 17 | do | 0.64 | 8 | 2 | 1,200 | 2 | 500 | 0.2 | 4.8 | 22.8 | 3.3 | 31.0 | 73.5 | 224 |
| 18 | do | 0.64 | 8 | 2 | 1,400 | 4 | 600 | 0.1 | 7.1 | 21.9 | 2.9 | 31.9 | 68.7 | 81 |
| 19 | do | 0.64 | 8 | 5 | 1,000 | 4 | 600 | 0.2 | 5.3 | 25.5 | 3.2 | 34.2 | 74.5 | 167 |
| 20 | do | 0.64 | 8 | 5 | 1,000 | 2 | 600 | 0.1 | 5.3 | 23.2 | 2.7 | 31.4 | 74.0 | 177 |
| 21 | do | 0.64 | 8 | 5 | 1,000 | 2 | 500 | 0.1 | 5.5 | 21.6 | 2.4 | 29.7 | 73.0 | 211 |
| 22 | do | 0.64 | 8 | 5 | 1,000 | 2 | 400 | 0.2 | 4.1 | 27.0 | 3.6 | 34.8 | 77.5 | 153 |
| 23 | do | 0.75 | 30 | 2 | 1,200 | 2 | 800 | 0.3 | 6.4 | 18.5 | 1.1 | 26.3 | 70.4 | 41 |
| 24 | do | 0.75 | 30 | 2 | 1,200 | 2 | 600 | 0.1 | 7.0 | 17.9 | 1.4 | 26.4 | 67.8 | 180 |
| 25 | do | 0.75 | 30 | 2 | 1,200 | 2 | 500 | 0.1 | 4.6 | 22.4 | 2.3 | 29.5 | 76.1 | 259 |
| 26 | do | 0.75 | 30 | 5 | 1,000 | 2 | 500 | 0.1 | 6.7 | 22.8 | 2.1 | 31.7 | 71.9 | 142 |
| 27 | do | 0.75 | 30 | 5 | 1,000 | 2 | 600 | 0.2 | 7.2 | 19.6 | 1.7 | 28.6 | 68.4 | 235 |
| 28 | Nickel | 6.0 | 8 | 4 | 1,000 | 15 | 900 | 0.2 | 3.9 | 25.6 | 4.0 | 33.7 | 76.0 | 279 |

Referring to Table IV and Examples 14 to 22, calcining temperatures ranging from 1,000° to 1,400°F. and reducing temperatures ranging from 400° to 800°F. are compared employing a catalyst comprising 0.64 weight percent palladium on an acidic oxide base containing 8 percent zeolite. Within the series calcined at 1,000°F., productivities increase as the reducing temperature is decreased and a maximum productivity of 211 is obtained using the catalyst reduced at 500°F. Within the series calcined at 1,200°F. a similar dependence on reducing temperature is found, productivities increasing from 98 to 224 for catalysts reduced at temperatures ranging from 800°F. to 500°F. respectively. A further increase in productivity to 259 is obtained with a catalyst comprising 0.75 weight percent palladium on an acidic oxide support containing 30 weight percent zeolite, calcined at 1200°F. and reduced at 500°F. as shown in Example 25. Examples 23 to 27 indicate that the catalyst containing the higher percentage of zeolites are more sensitive to reducing temperation conditions include a reaction temperature within the range of about 300° to 400°F. and a hydrogen partial pressure within the range of about 100 to 500 pounds per square inch gauge.

4. The method of claim 1 wherein said Group VIII metal is nickel.

5. The method of claim 1 wherein said Group VIII metal is palladium.

6. The method of claim 1 wherein said catalyst consists essentially of tungsten, said Group VIII metal and said acidic oxide support.

7. A method of claim 1 wherein said crystalline zeolite is prepared by an alternative sequence of at least two ion exchanges and two calcinations.

8. The method of claim 1 wherein said catalyst is calcined at a temperature within the range of about 800° to 1500°F.

9. The method of claim 1 wherein said catalyst is calcined at a temperature within the range of about 1000° to 1200°F.

10. The method of claim 1 wherein said catalyst is reduced at a temperature within the range of about 400° to 1200°F.

11. The method of claim 1 wherein said catalyst is reduced at a temperature within the range of about 500° to 1000°F.

12. The method of claim 1 wherein said aromatic hydrocarbon charge is benzene.

13. The method for the catalytic hydroalkylation of benzene which comprises contacting said benzene charge and hydrogen at hydroalkylating conditions with a calcined and reduced catalyst comprising nickel and an acidic oxide support consisting essentially of a substantially alkali metal-free mixture of about 5 to 60 percent by weight of a crystalline zeolite and about 95 to 40 percent by weight of a silica-alumina cracking catalyst.

14. The method for the catalytic hydroalkylation of benzene which comprises contacting said benzene charge, at reaction temperature of about 110°F., and hydrogen at superatmospheric hydrogen partial pressure less than about 500 pounds per square inch gauge, with a calcined and reduced catalyst comprising a Group VIII metal selected from the group consisting of cobalt, nickel, and palladium and an acidic oxide support consisting essentially of a substantially alkali metal-free mixture of 5 to 60 percent by weight of a crystalline zeolite and about 95 to 40 percent by weight of a silica-alumina cracking catalyst.

* * * * *